May 21, 1968 J. SCHRÖDER ET AL 3,384,902

CIRCUIT ARRANGEMENT FOR DETECTING ERRORS IN GROUPS OF DATA BY COMPARISON OF CALCULATED CHECK SYMBOLS WITH A REFERENCE SYMBOL

Filed July 27, 1964 3 Sheets-Sheet 1

INVENTOR.
JURGEN SCHRODER
BY UWE BERTRAM

AGENT

May 21, 1968 J. SCHRÖDER ET AL 3,384,902

CIRCUIT ARRANGEMENT FOR DETECTING ERRORS IN GROUPS OF DATA BY COMPARISON OF CALCULATED CHECK SYMBOLS WITH A REFERENCE SYMBOL

Filed July 27, 1964 3 Sheets-Sheet 2

INVENTOR.
JURGEN SCHRODER
BY UWE BERTRAM
Frank R. Jifani
AGENT

| TR | $T_1$ | $T_2$ | $T_3$ | $T_4$ | $T_5$ | $T_6$ | $T_7$ | $T_8$ | $T_9$ | $T_{10}$ | $T_{11}$ | $T_{12}$ | |
|---|---|---|---|---|---|---|---|---|---|---|---|---|---|
| | 2 | 4 | 8 | 3 | 6 | 12 | 11 | 9 | 5 | 10 | 7 | 1 | $a_1$ |
| ZN | (1) | (3) | (7) | (2) | (5) | (11) | (10) | (8) | (4) | (9) | (6) | (0) | (a) |
| 1.S | 2 | 4 | 8 | 3 | 6 | 12 | 11 | 9 | 5 | 10 | 7 | 1 | $\beta_1$ |
| 2.S | 4 | 8 | 3 | 6 | 12 | 11 | 9 | 5 | 10 | 7 | 1 | 2 | $\beta_2$ |
| 3.S | 8 | 3 | 6 | 12 | 11 | 9 | 5 | 10 | 7 | 1 | 2 | 7 | $\beta_3$ |
| 4.S | 3 | 6 | 12 | 11 | 9 | 5 | 10 | 7 | 1 | 2 | 4 | 8 | $\beta_4$ |
| 5.S | 6 | 12 | 11 | 9 | 5 | 10 | 7 | 1 | 2 | 4 | 8 | 3 | $\beta_5$ |
| 6.S | 12 | 11 | 9 | 5 | 10 | 7 | 1 | 2 | 4 | 8 | 3 | 6 | $\beta_6 = \frac{\beta M-1}{2}$ |
| 7.S | 11 | 9 | 5 | 10 | 7 | 1 | 2 | 4 | 8 | 3 | 6 | 12 | $\beta_7$ |
| 8.S | 9 | 5 | 10 | 7 | 1 | 2 | 4 | 8 | 3 | 6 | 12 | 11 | $\beta_8$ |
| 9.S | 5 | 10 | 7 | 1 | 2 | 4 | 8 | 3 | 6 | 12 | 11 | 9 | $\beta_9$ |
| 10.S | 10 | 7 | 1 | 2 | 4 | 8 | 3 | 6 | 12 | 11 | 9 | 5 | $\beta_{10}$ |
| 11.S | 7 | 1 | 2 | 4 | 8 | 3 | 6 | 12 | 11 | 9 | 5 | 10 | $\beta_{11}$ |
| 12.S | 1 | 2 | 4 | 8 | 3 | 6 | 12 | 11 | 9 | 5 | 10 | 7 | $\beta_{12} = \beta M-1$ |

FIG.3

INVENTOR.
JURGEN SCHRODER
UWE BERTRAM
BY Frank R. Trifari
AGENT

United States Patent Office 3,384,902

Patented May 21, 1968

3,384,902

CIRCUIT ARRANGEMENT FOR DETECTING ERRORS IN GROUPS OF DATA BY COMPARISON OF CALCULATED CHECK SYMBOLS WITH A REFERENCE SYMBOL

Jürgen Schröder and Uwe Betram, Hamburg, Germany, assignors to North American Philips Company, Inc., New York, N.Y., a corporation of Delaware Filed July 27, 1964, Ser. No. 385,127
Claims priority, application Germany, July 27, 1963, P 32,291
3 Claims. (Cl. 340—146.1)

ABSTRACT OF THE DISCLOSURE

A circuit for indicating the correctness of groups of data bits including a keyboard for entering a group of data bits into a ferrite core memory matrix. A preselection counter receives the data word from the memory and is designed to run forward or backward to position the check symbols within the word into a first check symbol counter. A second set of check symbols is generated into the preselection counter by pulsing the memory matrix. The preselection counter is then read out into a second check symbol counter and the two check symbol counter contents are compared with a reference check symbol initially provided with the data word. A coincidence indicates an error-free data group.

This invention relates to data processing error checking systems and particularly to error checking systems employing associated test signs.

A prime requisite for a data processing system is that data be entered in a correct manner. In order to detect any errors in writing groups of digits (for example numbers of articles, accounts and policies) by means of an error check, these groups of digits are provided with check symbols (for example numerals or letters). When a group of digits provided with a check symbol is entered, the check symbol associated with the digit group is simultaneously calculated in a checking device connected in parallel with the keyboard of the entering apparatus and compared automatically with the entered check symbol. If the entered check symbol and the check symbol calculated do not agree, the checking device produces a signal as an indication of an incorrect entry or the entry of further data is stopped.

If errors occurring in the transmission of data, for instance by telephone lines, are to be detected, the checking device is connected in parallel with the data output member. At the reception of an erroneous group of data, the checking device provides a signal which may demand a repetition of the incorrectly received data group.

The laws which govern the computation of the check symbols are chosen so that a maximum number of errors occurring in the data groups can be detected by checking. Since the errors may be of a statistic or systematic kind, these kinds of errors must be recognisable with the aid of the check symbols in accordance with the use of the apparatus. Systematic errors especially occur in manual read-in by means of a keyboard.

The invention relates to a circuit arrangement for computing check symbols for protecting data groups from writing and/or transmission errors and for checking data groups for errors with check symbols. In contrast with the known arrangements for computing the check symbols and for checking, a conversion of the symbols or digits into a binary code is not required. The electronic arrangement is thus simplified when it is used for checking read-in errors. Moreover, owing to the law chosen here, errors of higher order (2, 3, 4, . . . arbitrary errors in one data group) can be detected without exception. This high percentage of detection is achieved by using a plurality of check symbols. The amount of electronic equipment required to this end is, however, not markedly greater than in apparatus using only one check symbol.

The main characteristic of the novel circuit arrangement consists of a ferrite core matrix acting upon a forwards and backwards operating preselection counter. The $r$ column wires of the matrix are energized by a symbol keyboard. The keys of the keyboard that are marked by $(r^x-1)$ modulo M are connected to the associated $x^{th}$ column wire of the matrix, while the number of column wires is lower by one than the number of the keys. $x$ can assume the values $l$ to $r$ and $r$ is a prime number smaller than the prime number M indicating the number of keys. The row wires can be sequentially controlled by a ring counter which is rendered operative through a trigger circuit actuated by the symbol keyboard and causes, through a trigger circuit, the change-over of the preselection counter from forwards operation to backwards operation or vice versa in accordance with the position of the symbols of the data group. The preselection counter and two keyboard-controlled trigger circuits act upon a checking trigger through an and-gate, deriving the pulses produced in said preselection counter and controlling the check symbols.

Thus, the individual symbols are associated with the pertinent augends and addends which serve the computing of the check symbols by a ferrite core matrix in the form of a switching core matrix. The switching core matrix has selection and storage properties so that the advantageous possibility is obtained of automatically ascertaining the check symbols in sequence through a single preselection counter.

The number of the check symbols is determined by the minimum error-detecting capacity of the circuit arrangement and the given length of a data group to be checked symbols, the length of which is marked by check signs. With a restriction to, for example, two check symbols, the law of formation thereof is:

$$P_1=\sum_{i=1}^{n} g_{1i}(a_i+1) \bmod M$$

$$P_2=\sum_{i=1}^{n} g_{2i}(a_i+1) \bmod M$$

$$g_{1i};\ g_{2i}<M$$

$$(a_i+1)\leqslant M$$

where M is a prime number.

$a_1, a_2, \ldots a_n$ are symbols of a data group of the 1st, 2nd, . . . $n^{th}$ place. Non-numerical symbols must be associated with numerical values. The number $n$ indicates the length of the data group; the quantities $g_{1i}$, $g_{2i}$ indicate weights attached to the individual places. In choosing the weights the following condition must be satisfied:

$$\begin{matrix} g_{1i} & g_{1j} \\ g_{2i} & g_{2j} \end{matrix} \neq 0 \bmod M$$

where $i \neq j i;=1, 2 \ldots n$.

The preceding equation means: all possible determinants of the second order formed from two pairs of weights of the places $i$ and $j$ must not be zero or a multiple of M. If a system comprising $k$ check symbols is chosen, the aforesaid rule must be extended so that the determinants and the possible subdeterminants of the weight matrix of the $k^{th}$ degree must not be zero or a multiple of M.

When the aforesaid condition is observed, the weights are chosen so that a particularly simple electronic arrangement for computing the check symbols is obtained.

$$g_{1i}=\xi_{i-1}^{i-1} \bmod M$$

$$g_{2i}=\beta \bmod M$$

$$\xi;\ \beta=1, 2 \ldots \text{integer}$$

The formation of the weight is subject to an exponential law. Therefore the weights $g_{2i}$ are complementary to M at a distance of $$\frac{M-1}{2}$$

places. The number of the rows in the ferrite core matrix thus becomes:

$$s=\frac{M-1}{2}, \text{ since only } \frac{M-1}{2}$$

weights are directly formed. The remaining $$\frac{M-1}{2}$$

quantities are found by complement formation. The check symbols $P_1$ and $P_2$ are composed of individual augends and addends:

$$P_1=\sum_{i=1}^{n}\alpha_i \bmod M$$

$$P_2=\sum_{i=1}^{n}\beta_i \bmod M$$

The augends and addends are formed with $$\alpha_i=g_{1i}(a_i+1) \bmod M \quad (1)$$

$$\beta_i=g_{2i}(a_i+1) \bmod M \quad (2)$$

The drawing shows an embodiment. In the drawing

FIG. 3 shows a table illustrating the operation of the invention.

Figure 1:
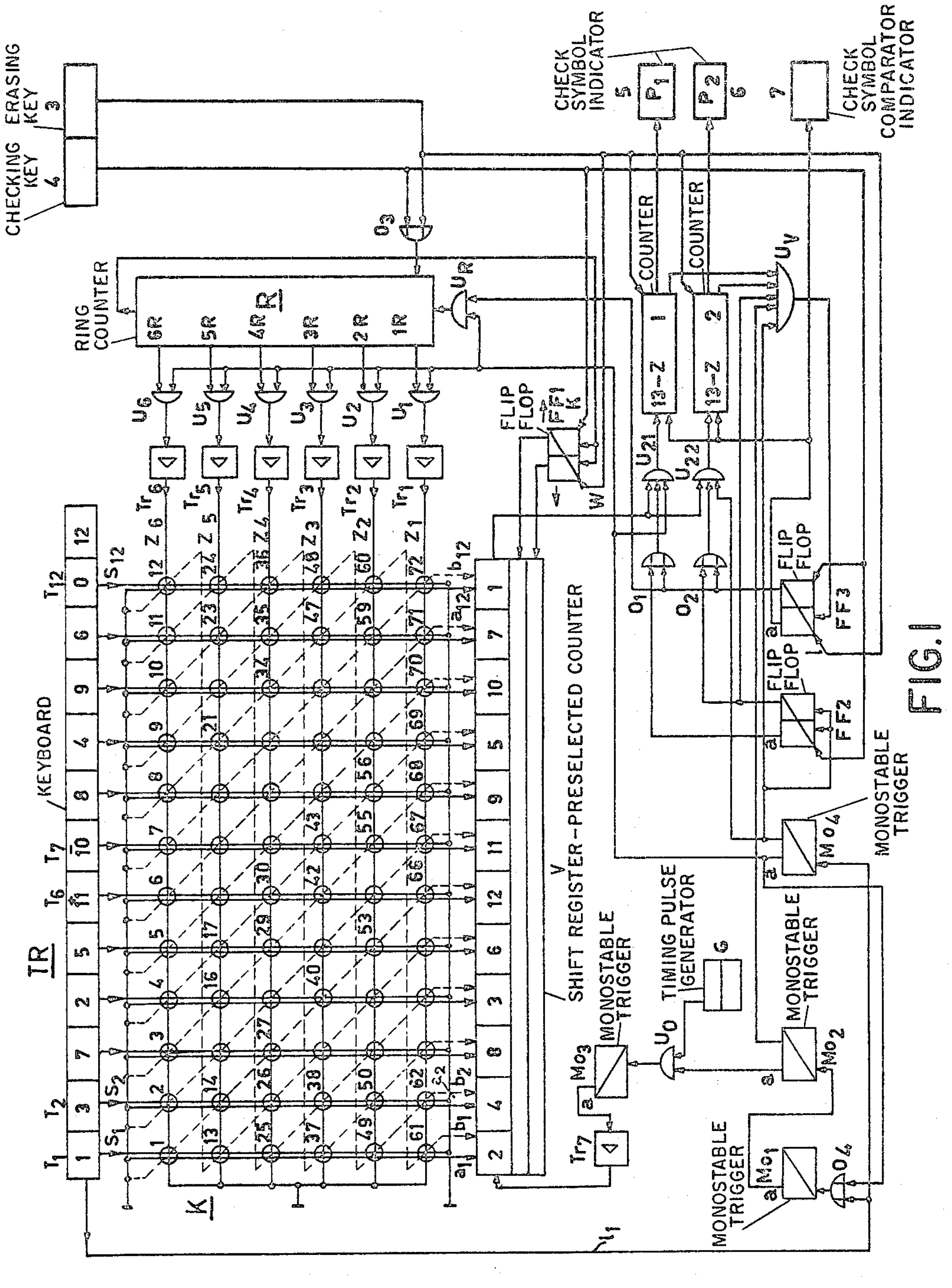
FIG. 1 is an embodiment of a circuit arrangement for obtaining two check symbols.

The apparatus to be described with reference to FIG. 1 of the drawing is intended for the following numerical values:

$a_i$: 0, 1, 2, 3, 4, 5, 6, 7, 8, 9, +, —
M: 13
$n$: arbitrary
$\xi$: 1
$\beta$: 2

The augends and addends $\alpha_i$, $\beta_i$ according to Equations 1 and 2 as a function of symbol $a$ and place $i$ are given in the table of FIG. 3. In the table of FIG. 3 the horizontal row indicates the symbol chosen, whereas the rows 1S, 2S, etc., relate to the sequence in which the symbols are chosen.

From the table of FIG. 3 it will be apparent that the check sign $P_2$ can be composed at most of twelve different addends $\beta_1, \ldots \beta_{12}$. Since each time six addends are pairwise complementary to 13, only the addends $\beta_1, \ldots \beta_6$ are formed; the other $\beta_6, \ldots \beta_{12}$ are found by complement formation, as stated above.

The arrangement of the marked keys $T_1, T_2, \ldots T_{12}$ of the keyboard TR in the table and in the circuit diagram of FIG. 1 was chosen in this manner for the sake of clarity. In the apparatus shown the keyboard $T_1 \ldots T_{12}$ may be formed by any known arrangement.

The keyboard TR is connected through a ferrite core matrix K to a preselection counter V in the form of a shift register which can be operated forwards and backwards. The column wire $S_1$ from the keyboard TR is threaded through the cores 1, 13, . . . 61 and each core has two output windings $a_1$, $b_1$, and $a_2$, $b_2$ . . . respectively, which are connected to the preselection counter V. The $x^{th}$ of 12 column wires is connected to the key marked by $(r^x-1)$ modulo M, wherein $x$ is successively equal to 1, 2, 3, . . . 12.

A trigger pulse derived from the keyboard passes through the conductor 1 to monostable triggers M*o*1, M*o*4 with different time constants $\tau_1$ and $\tau_4$. M*o*1 is connected to a monostable trigger M*o*3 (time constant $\tau_3$) through a monostable trigger M*o*2 (time constant $\tau_2$) and an and-gate $U_o$, to which is also connected a timing pulse generator G. Through the driving stage T*r*7 the preselection counter V is then controlled.

Furthermore, a bistable trigger FF2 is provided, which through or-gates $O_1$, $O_2$, controls the and-gate $U_{21}$, $U_{22}$.

The row wires $Z_1, \ldots Z_6$ are energized through and-gates $U_1, \ldots U_6$ by a 6-position ring counter R in cooperation with a trigger monostable M*o*4. The bistable trigger FF1 serves for the forwards and backwards adjustments of the preselection counter V, whereas the bistable trigger FF3 is provided for the comparison of the check symbol, which comparison is indicated at 7 in the case of correctness. The indication of the computed check symbols $P_1$, $P_2$ is carried out in known manner at 5 and 6.

Figure 2:
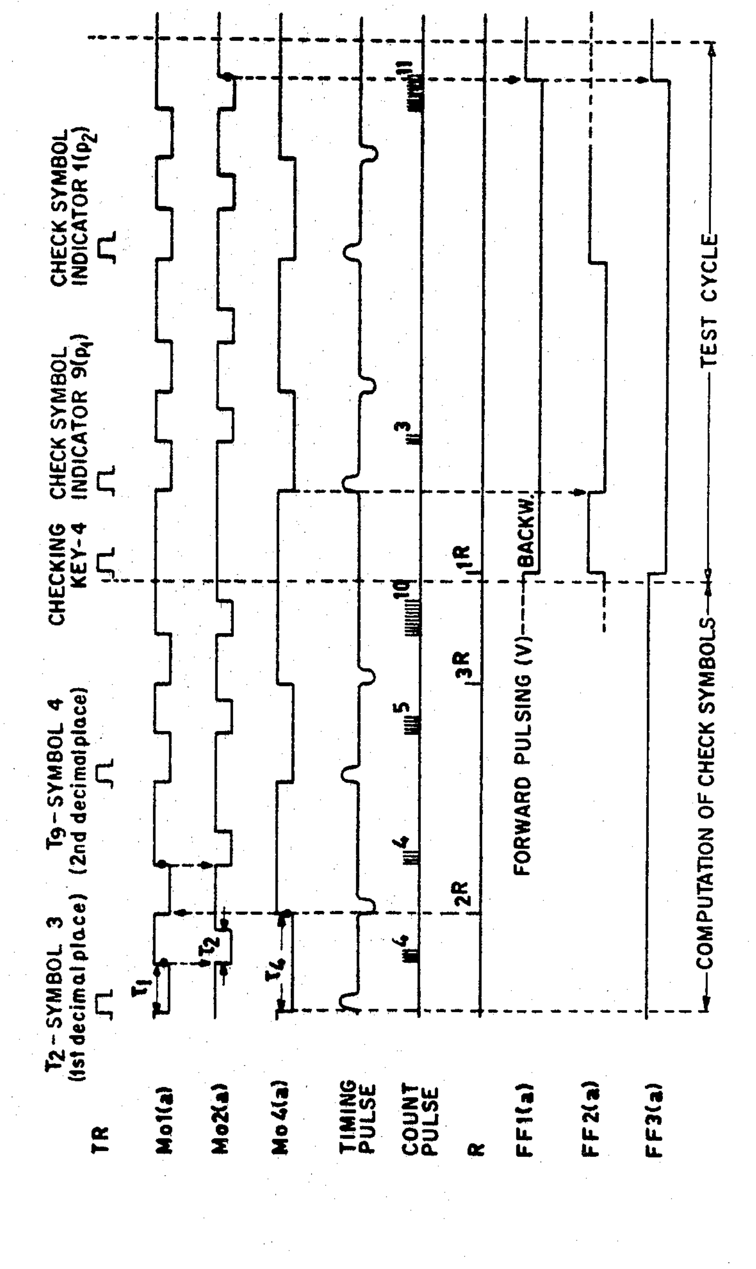
FIG. 2 shows a pulse diagram.

The operation can be seen in detail from the block diagram of FIG. 1 and the pulse diagram of FIG. 2. The heart of the apparatus is a switching core matrix K, the 2 x 12 outputs $a_1$, $b_1$, . . . of which are connected to a preselection counter V. All cores of the matrix are held in a predetermined initial position by D.C. premagnetisation. The column wires $S_1$, . . . are energized by the keys $t_1$, . . . and the line wires $Z_1$, . . . by a ring counter R having outputs 1R, 2R, etc. (1-out-of-6). Each time a key $T_1$, $T_2$, etc. is depressed the ring counter is advanced by one stage. When for example, the key $T_2$ with the symbol "3" is depressed, the monostable multivibrators M*o*4 and M*o*1 flip over simultaneously. M*o*4 controls, through the and-gate $U_1$, the driver $Tr_1$ the driving current of which suppresses the premagnetisation in this row wire $Z_1$. The column current passing momentarily through the line $S_2$ changes over the core 62 and induces a voltage pulse in the two output windings $a_2$, $b_2$ threaded through it. Owing to the different senses of winding of these windings the pulses have opposite polarities. Only one of these two pulses is capable of marking the preselection counter V on account of its polarity. In this case the pulse is carried by the supply conductor $a_2$ shown by a full line, the marking winding for the value "4." Subsequently, the monostable triggers M*o*1, M*o*2, the timing pulse generator G, the monostable trigger M*o*3 and the driving stage $Tr_7$ supply shift pulses to the preselection counter V constituted by a shift register (see pulse diagram of FIG. 2). In accordance with the preselection, 4 pulses appear at the output, which are stored in the 13-counter 13 $Z_1$. After the time $t_4$ the monostable trigger M*o*4 flips back and the core 62 flips over by the premagnetisation to the initial state. Pulses of opposite polarities are thus again induced in the output windings $a_2$, $b_2$. In this case only the pulse on the conductor $b_2$, which is indicated by a broken line, reaches the preselection counter V. The pulses appearing at the output reach the 13-counter 13 $Z_2$, since the and-gate $U_{21}$ is closed by the monostable trigger M*o*4 and the and-gate $U_{22}$ is opened. When the monostable trigger M*o*4 flips back, the ring counter R jumps back to the position 2 through $U_R$ and prepares the and-gate $U_2$. When a key $T_6$ at the sixth position is depressed, the ring counter R jumps back subsequently to 1, and the carry pulse through the bistable trigger FF1 changes over the preselection counter V to "backwards counting." Thus the addends $\beta_7$ to $\beta_{12}$ (see table of FIG. 3) are obtained by complement formation to 13. After each data group is entered the check symbols $P_1$, $P_2$ are indicated. Before the entry of the next number the erasing key 3 must be depressed.

The checking function of the apparatus is such that new check symbols are calculated from a data group provided with check symbols. Said check symbols are compared with the check symbols associated with the data group. In the event of agreement a signal "comparison correct" is produced at 7.

The check is performed in the following way. A data group is written in the apparatus. This may be carried out by manual operation of a keyboard or by electronic agency. The computed check symbols are recorded in the 13-counters 1 and 2. By actuating the checking key 4, which acts upon the triggers FF1, FF2, FF3 and through the or-gate $O_3$, the ring counter R, the apparatus is informed that the symbols following the data group are to be regarded as check symbols. The ring counter R is moved to the first position 1R. The preselection counter V is changed over to "backwards counting" via the bistable trigger FF1. The bistable trigger FF2 flips over to the initial state. The checking trigger FF3 is switched on and closes the and-gate $U_R$. Since the preselection counter V is in the "backwards counting" position, the 13-complement minus 1 of the recorded numbers represent the test symbols are formed so that the 13-counters 1 and 2 are in position 12, when the computed and the recorded check symbols agree. If this is the case, a pulse passes through the and-gate $U_v$ and flips back the checking trigger FF3. As a result an indication is given at 7 as a criterion for a correct entry of the data group.

All counters are automatically adjusted to zero, so that the apparatus is immediately ready for further use. If the calculated and the recorded test symbols do not agree, the apparatus must be readjusted for use through the erasing key 3.

What is claimed is:

1. An error checking circuit for determining error in a data group having a first set of check symbols, comprising a memory matrix, a keyboard for entering said data group into said matrix, a shift register coupled to said matrix, a first check symbol counter, a second check symbol counter, a logic circuit having a first and a second condition in response to a single external stimulus, said logic circuit including first means responsive to said first condition for reading said data group from said memory matrix into said shift register, said read data group including a second set of check symbols, shifting means responsive to said first condition of said logic circuit for shifting said second set of check symbols of said data group into said first check symbol counter, said logic circuit further including second means responsive to said second condition for re-reading said data group into said shift register, said re-read data group including a third set of check symbols, said shifting means responsive to said second condition of said logic circuit for shifting said third set of check symbols into said second check symbol counter, and means responsive to a further condition of said keyboard for comparing the condition of said first and second check symbol counters with the first set of check symbols in said data group for coincidence.

2. An error checking circuit for determining errors in a data group including a first set of check symbols, comprising a keyboard having a plurality of individual activatable keys for entry of said data group, a magnetic core memory matrix having a plurality of rows and columns, said columns each being associated with a respestive key on said keyboard, a bidirectional multistage shift register, each of said stages being coupled to a respective column of said matrix, a ring counter having an input and an output and a plurality of stages, each of said ring counter stages being coupled to a respective row of said memory matrix, a first check symbol counter, a second check symbol counter, said keyboard including a checking key for supplying a first check symbol, means responsive to excitation of said checking key and to the output of said ring counter for setting said shift register in either a forward or backward counting mode in accordance with the position of the check symbols in the data group, a logic circuit having a first and a second condition in response to a single external stimulus, said keyboard supplying said stimulus, said logic circuit including first means responsive to said first condition for reading said said data group from said memory matrix into said shift register, said read data group including a second set of check symbols, shifting means responsive to said first condition of said logic circuit for shifting said second set of check symbols of said data group into said first check symbol counter, said logic circuit further including second means responsive to said second condition for re-reading said data group into said shift register, said re-read data group including a third set of check symbols, said shifting means responsive to said second condition of said logic circuit for shifting said second set of check symbols into said second check symbol counter, and further means responsive to excitation of said checking key for comparing the condition of said first and second check symbol counters with the first set of check symbols in said data group for coincidence.

3. The combination of claim 2 wherein the numerical indicia of each of said keys is determined by the relationship:

$$(r^x-1) \text{ Modulo M}$$

wherein $r$ is a prime number smaller than the number of keys; $x$ is the numerical designation of each column (1st, 2nd, 3rd, . . . (M−1)); and M is the number of keys.

References Cited

UNITED STATES PATENTS

| | | | |
|---|---|---|---|
| 2,754,054 | 7/1956 | Helmig et al. | 235—61 |
| 2,943,787 | 7/1960 | Cartwright | 235—71.7 |
| 3,063,636 | 11/1962 | Sierra | 340—146.1 |
| 3,223,974 | 12/1965 | Kok et al. | 340—146.1 |
| 3,270,318 | 8/1966 | Strawbridge | 340—146.1 |

MALCOLM A. MORRISON, *Primary Examiner.*

M. SPIVAK, C. E. ATKINSON, *Assistant Examiners.*